Patented Dec. 29, 1936

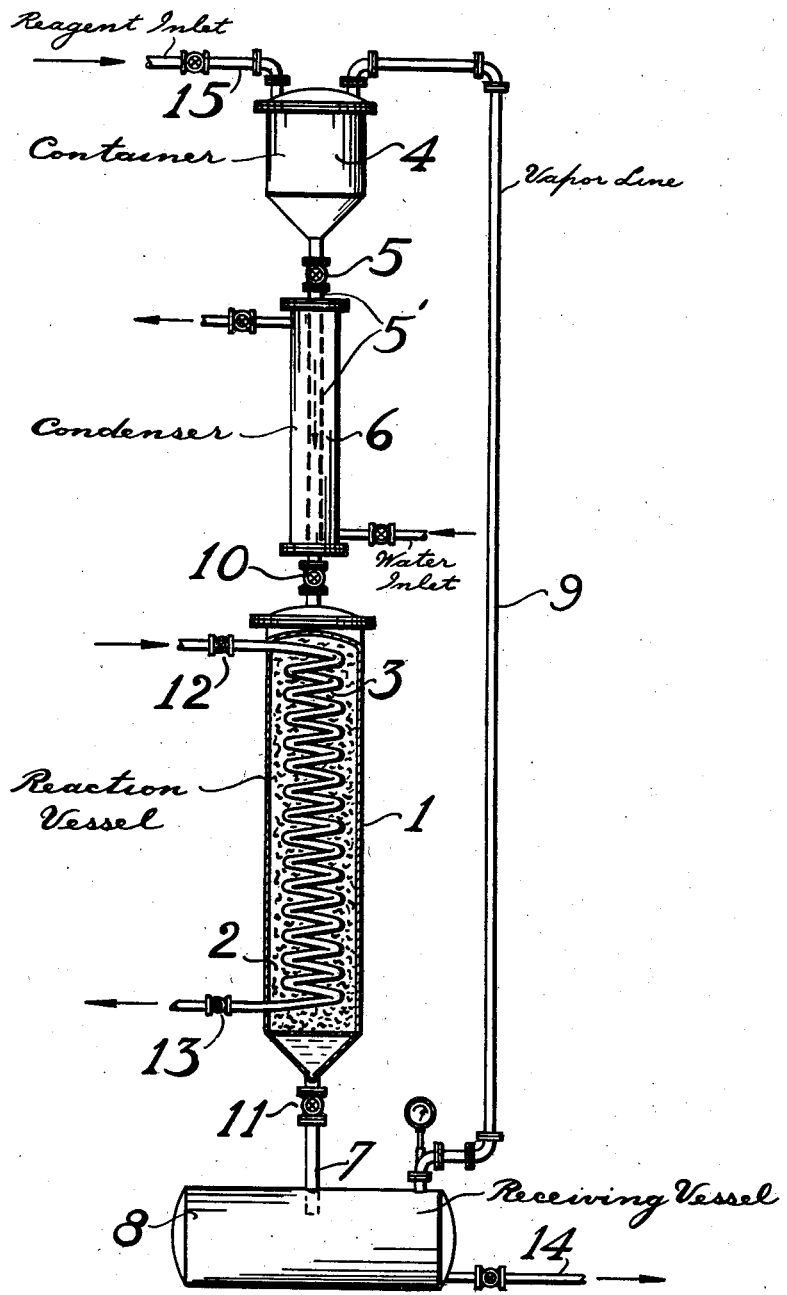

2,066,198

UNITED STATES PATENT OFFICE 2,066,198

PROCESS FOR PREPARING GRIGNARD COMPOUNDS

Hyym E. Buc, Roselle, N. J., assignor to Standard Oil Development Company, a corporation of Delaware Application February 26, 1932, Serial No. 595,333

9 Claims. (Cl. 260—11)

This invention relates to a new and improved method for preparing metallo organic compounds. This invention relates particularly to the preparation of magnesium compounds such as the alkyl magnesium halides and is of especial application in the synthesis of organic compounds according to the method of Grignard.

The Grignard synthesis depends upon the preparation of magnesium organic halides and to the use of these compounds in anhydrous solvents for the synthesis of various classes of organic compounds such as hydrocarbons, olefines, primary, secondary and tertiary alcohols, aldehydes, ketones, carboxylic acids and the like. Magnesium compounds suitable for the Grignard synthesis and containing aryl and/or alkyl radicals, magnesium and a halide such as chlorine, bromine or iodine are generally termed Grignard compounds. These Grignard compounds have the general formula R—Mg—X where R represents aryl and/or alkyl hydrocarbon radicals and X usually represents a halogen.

The Grignard synthesis and the preparation of Grignard compounds are usually conducted in the presence of anhydrous ethyl ether and conditions for conducting the synthesis and the various steps to be used therein have been thoroughly described in the common organic chemistry texts and the literature. Other solvents than ethyl ether may be used and the anhydrous thio-ethers described in the co-pending application Ser. No. 575,464 filed November 16, 1931 by William Seaman, are especially suitable.

My invention will be understood from the following description of the drawing and the examples given in connection therewith.

The drawing is a diagrammatic illustration in sectional elevation of an apparatus suitable for conducting the herein described process. The numeral 1 represents an elongated vertical reaction vessel. This vessel is filled with magnesium metal 2 in a finely divided form of large surface area such as powder, shot, turnings and the like. The temperature in this zone is controlled by circulating a liquid such as water through tubes 3 which are means for indirect heat exchange between the reaction zone and the circulated liquid. Other means for temperature control may also be used. For example, the tubes 3 may be suitably arranged to permit the use of a boiling liquid for temperature control, the heat of reaction being removed as latent heat in the vapor of the control liquid. Liquids of suitable boiling point, such as butane, methyl bromide, ethyl chloride, pentane, and the like, may be used, and the temperature may also be controlled by regulation of the pressure on the liquid. The vapor formed from the control liquid may be condensed in suitable external coolers, and the condensate returned to tubes 3. Volatile inert liquids such as propane, butane, pentane, and the like, may also be used for temperature control by direct heat exchange. In this event the regulating liquid, such as butane, may be supplied in admixture with the reagents, and the temperature of the condenser may be regulated to condense and reflux the vapors of this liquid.

A solution of an organic halide, such as butyl chloride, in a suitable solvent, such as ethyl ether, is maintained in container 4 and is supplied through valve 5 and pipe 5', in condenser 6 to the upper portion of reaction zone 1. This reagent flows downwardly over the magnesium and reacts therewith to form a compound containing butyl magnesium chloride which is carried downwardly in the solvent through the exit pipe 7 into a receptacle, denoted by receiving vessel 8. As it is desirable to maintain the entire system under substantially anhydrous conditions, it is preferable that contact with the atmosphere be avoided to as great an extent as possible. This is accomplished in the present apparatus by vapor line 9 which serves to equalize the pressure between vessels 4 and 8 and to thereby permit the liquid solvent, carrying reagents and products, to flow by gravity through condenser 6 and reaction vessel 1 to receiving vessel 8. If desired a plurality of reaction vessels similar to 1 may be connected in series therewith. In this case it is preferred to have suitable valves permitting the shutting off of each reaction zone independently of the others so that it may be removed from the system for repacking with magnesium and reinsertion into the system. Valves 10, 11, 12 and 13 are used for effecting such removal and replacement. The product may be withdrawn from receptacle 8 by line 14, or further reactions and syntheses may be conducted in the receptacle if desired. Additional reagent may be added to the container 4 by line 15.

The following example illustrates one means of conducting the process covered by this invention: Magnesium metal in the form of turnings, ribbon, or very coarse powder is placed in a tube having means for temperature control such as heating or cooling coils distributed therein. An ether solution containing a small amount of iodine or bromine or an easily reacting metal or organic iodide or bromide is trickled through the magnesium until the magnesium is activated as shown by the appearance of corrosion. If necessary hot water may be passed through the coils to accelerate the activation but if the ether is sufficiently anhydrous the activation can be effected at normal room temperature in about one half to two hours. Following the activation a solution of an alkyl chloride in ether is passed slowly into the top of the reaction zone. This zone is cooled substantially to room temperature or to any desired temperature depending on the particular halide used, by means of water circulated through the coils. The temperature is thereafter maintained as required by the continued circulation of water through these coils to remove the heat of reaction. A liquid product consisting of a solution of alkyl magnesium chloride in ether and substantially free from any unreacted alkyl chloride is withdrawn from the lower portion of the reaction zone. With n-butyl chloride a yield of 85% of the Grignard reagent is obtained. With isopropyl chloride the yield is about 80 to 85%. The products are suitable for use in the Grignard syntheses according to known methods, or for other purposes.

This process possesses many advantages which are readily discernible over the customary batch processes used for the preparation of Grignard compounds. Losses due to the formation of hydrocarbons by reaction of the Grignard compound with unreacted alkyl halide are almost entirely eliminated since there is always a large excess of magnesium present in the reaction zone and the opportunity for contact of alkyl halide with magnesium alkyl halide is greatly lessened. Alkyl chlorides may be used in this process as readily as the bromides or iodides, whereas ordinarily the use of chlorides involves considerable difficulty and is accompanied by a greatly decreased yield. Hazards due to the volatile nature and inflammable characteristics of the solvents used and the highly exothermic nature of the reaction are greatly lessened since only a very small amount of reagent is present in the reaction zone at any time. The regulation of the temperature of the reaction zone is also greatly improved with resulting increase in yield of the desired product. The temperature of the reaction zone depends upon the particular reagents used and may be either above or below room temperature. The reaction zone may accordingly be heated or cooled according to the requisite of each reaction and may be, if desired, coated with heat insulating material. Special high boiling solvents, such as dimethyl aniline, are suitable for use when the metallo organic compounds are to be prepared at elevated temperatures. A smaller amount of solvent is also required. The reaction may be made continuous by using several tubes of magnesium connected in series and/or parallel and by removing, refilling and replacing tubes in which the magnesium is used up during the progress of the reaction.

This method and apparatus are equally applicable to the preparation of other metallo organic halides and metallo organic compounds in general in addition to the Grignard compounds described above. For example, zinc, lead, tin and other metals may be used instead of magnesium.

This invention is not to be limited to any theory of the reactions described herein, nor to any examples of the process or apparatus which are given solely for purpose of illustration, but only by the following claims in which I wish to claim all novelty insofar as the prior art permits.

I claim:

1. The process for preparing metallo organic compounds which comprises contacting an organic halide of the group consisting of alkyl and aryl halides with a large excess of a metal of the group consisting of magnesium, zinc, lead and tin, of large surface area, in a reaction zone, and removing the product as fast as formed from the reaction zone to avoid, as far as possible, contact of unreacted organic halide with said product.

2. The process for preparing Grignard compounds of the general formula R—Mg—X, where R is an alkyl group and X is a halogen, which comprises feeding an alkyl halide into one part of a reaction zone where said halide is contacted with a large excess of magnesium of a form having large surface area, and removing the resultant alkyl magnesium halide from another part of said reaction zone as fast as formed to avoid contact of unreacted alkyl halide with the alkyl magnesium halide product as far as possible.

3. The process according to claim 2, in which the alkyl halide is fed in ether solution.

4. The process according to claim 2, in which the reaction is initiated by contacting the magnesium with a small amount of an activator selected from the group consisting of iodine, bromine and easily reacting metal iodides, metal bromides, organic iodides and organic bromides.

5. The process according to claim 2, in which an alkyl chloride is used.

6. Process according to claim 2, carried out at approximately room temperature.

7. Process according to claim 2, carried out in a vertical elongated reaction zone by feeding the alkyl halide in at the top and withdrawing alkyl magnesium halide at the bottom.

8. Process according to claim 2, carried out continuously by continuously feeding alkyl halide dissolved in a solvent, and continuously separating the solvent from the alkyl magnesium halide product and recycling said solvent with the alkyl halide feed.

9. The process for preparing Grignard compounds which comprises trickling an ether solution of alkyl chloride downwardly through an elongated vertical reaction zone containing a large excess of finely divided magnesium over the amount of magnesium required to combine with the amount of alkyl halide present in the reaction zone at any particular time, controlling the temperature in the reaction zone within limits suitable for the production of the particular Grignard compound being prepared and withdrawing an ether solution of alkyl magnesium chloride from the bottom of said reaction zone as fast as it reaches the bottom.

HYYM E. BUC.